US011162826B2

(12) United States Patent
    Qiu

(10) Patent No.: US 11,162,826 B2
(45) Date of Patent: Nov. 2, 2021

(54) AUXILIARY CALIBRATION DEVICE

(71) Applicant: AUTEL INTELLIGENT TECHNOLOGY CORP., LTD., Guangdong (CN)

(72) Inventor: Longxue Qiu, Guangdong (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 0 days.

(21) Appl. No.: 17/201,844

(22) Filed: Mar. 15, 2021

(65) Prior Publication Data
    US 2021/0199478 A1    Jul. 1, 2021

Related U.S. Application Data

(60) Division of application No. 16/744,668, filed on Jan. 16, 2020, now Pat. No. 11,002,574, which is a
    (Continued)

(30) Foreign Application Priority Data

Sep. 29, 2017 (CN) .......................... 201710911633.1

(51) Int. Cl.
    *F16M 11/20* (2006.01)
    *G01D 18/00* (2006.01)
    (Continued)

(52) U.S. Cl.
    CPC ......... *G01D 18/00* (2013.01); *F16M 11/2085* (2013.01); *F16M 11/24* (2013.01); *B60W 50/00* (2013.01); *B60W 2050/0083* (2013.01)

(58) Field of Classification Search
    CPC .... G01D 18/00; F16M 11/2085; F16M 11/24; B60W 2050/0083; B60W 50/00; B16M 11/2085
    (Continued)

(56) References Cited

U.S. PATENT DOCUMENTS 1,511,336 A * 10/1924 Hoey ....................... F16M 7/00
                                                        248/656
5,393,028 A *  2/1995 Satoh .................. B60N 2/0232
                                                        248/420
(Continued)

FOREIGN PATENT DOCUMENTS

CN    102590796 A    7/2012
CN    102844800 A    12/2012
(Continued)

OTHER PUBLICATIONS

Xingyun Yang; "The Design of Correcting Device for Automotive Active Cruise Radar and Lane Keeping System", Machine Design and Manufacturing Engineering, vol. 43, No. 4, Apr. 2014, pp. 56-59 . . . English Abstract at the bottom of p. 59.
The Extended European Search Report dated Mar. 16, 2021; Appln. No. 18860812.9.

*Primary Examiner* — Robert R Raevis

(57) ABSTRACT

The present invention discloses an auxiliary calibration device. The auxiliary calibration device may be configured to mount one or more calibration apparatuses. The auxiliary calibration device includes: a supporting frame; a guide rail, where the guide rail is mounted on the supporting frame; and a slider, where the slider is mounted on the guide rail, movable along the guide rail, and disposed to fasten a calibration apparatus used for calibration. The present invention may be applied to the field of auxiliary calibration devices of vehicles. By disposing a guide rail and a slider structure, the calibration apparatus required by calibration can be conveniently moved to a required position, thereby facilitating calibration for sensors of different types or sensors of a same type in different models of vehicles. Therefore, the auxiliary calibration device has a good commonality and is conveniently used.

26 Claims, 3 Drawing Sheets

Related U.S. Application Data continuation-in-part of application No. PCT/CN2018/107668, filed on Sep. 26, 2018.

(51) Int. Cl.
*F16M 11/24* (2006.01)
*B60W 50/00* (2006.01)

(58) Field of Classification Search
USPC ....... 73/1.01, 1.75, 1.79; 356/243, 247, 248;
248/637–681, 157, 419, 420, 161, 404,
248/405
See application file for complete search history.

(56) References Cited

U.S. PATENT DOCUMENTS

2010/0318316 A1* 12/2010 Fesmire ................ G01K 17/00
702/136
2018/0180984 A1* 6/2018 Pyo ...................... H04N 13/239

FOREIGN PATENT DOCUMENTS

| | | |
|---|---|---|
| CN | 202583453 U | 12/2012 |
| CN | 106249223 A | 12/2016 |
| CN | 106405526 A | 2/2017 |
| CN | 107449461 A | 12/2017 |
| DE | 102015112368 A1 | 2/2017 |
| WO | 2011/128739 A1 | 10/2011 |

* cited by examiner

AUXILIARY CALIBRATION DEVICE

CROSS-REFERENCE TO RELATED APPLICATION

The present application is a divisional application of U.S. application Ser. No. 16/744,668, filed on Jan. 16, 2020, which is a continuation-in-part of International Patent Application No. PCT/CN2018/107668 filed on Sep. 26, 2018, which claims priority to Chinese Patent Application No. 201710911633.1 filed on Sep. 29, 2017, both of which are incorporated herein by reference in their entireties.

BACKGROUND

Technical Field

The present application relates to the field of auxiliary calibration devices for vehicles, and in particular, to an auxiliary calibration device that can calibrate various sensors of a vehicle.

Related Art

With continuous improvement on power performance and comfort of a vehicle, more sensors are applied to the vehicle, and control software inside a vehicle electronic control unit (ECU) also becomes more complex. Normal work of the sensors has important impact on security of the vehicle in a driving process. Therefore, correction and calibration for the sensors have great significance.

Because positions of calibration apparatuses that are used when different sensors in a same vehicle are calibrated are different, and positions of calibration apparatuses that are used when sensors of a same type in different models of vehicles are calibrated are also different, an auxiliary calibration device that can conveniently adjust a position of a calibration apparatus needs to be provided.

SUMMARY

To resolve the foregoing technical problem, the present invention provides an auxiliary calibration device. The auxiliary calibration device can correct and calibrate various sensors mounted in a vehicle, to ensure normal work of the sensors, thereby ensuring security of the vehicle in a driving process.

To achieve the objective of the present invention, embodiments of the present invention provide an auxiliary calibration device. The auxiliary calibration device may be configured to mount one or more calibration apparatuses. The auxiliary calibration device includes:

a supporting frame;

a guide rail, where the guide rail is mounted on the supporting frame; and a slider mounted on the guide rail, the slider being movable along the guide rail, the slider being configured to fasten a calibration apparatus.

For the auxiliary calibration device provided in this embodiment, the supporting frame is provided with the guide rail and the slider. The slider is movable along the guide rail, and is configured to fasten a calibration apparatus that is used when calibration is performed. When calibration is performed, the slider may move along the guide rail, and may drive the calibration apparatus on the slider to move, so as to move the calibration apparatus to a position required by calibration. Therefore, the calibration can be easily performed. In a calibration process, sensors on the vehicle can be calibrated and corrected, so that the sensors can work normally, thereby ensuring security performance of the vehicle.

By disposing a guide rail and a slider structure, a calibration apparatus can be conveniently moved to a required position, thereby facilitating calibration for sensors of different types or sensors of a same type in different models of vehicles. Therefore, the auxiliary calibration device provided in this embodiment has a good commonality and is conveniently used.

Optionally, the guide rail includes a longitudinal guide rail, and the slider includes a longitudinal slider, the longitudinal slider being movable along the longitudinal guide rail.

The longitudinal slider is movable along the longitudinal guide rail, to adjust a height of the longitudinal slider, and further to drive the calibration apparatus fastened on the longitudinal slider to move to a height required by calibration, thereby facilitating calibration for the sensors.

Optionally, the supporting frame includes a rectangular frame that is disposed in a longitudinal direction, and the longitudinal guide rail includes a first longitudinal guide rail portion and a second longitudinal guide rail portion that are disposed on two longitudinal bars of the rectangular frame. Two ends of the longitudinal slider respectively fit the first longitudinal guide rail portion and the second longitudinal guide rail portion.

A lifting screw rod is disposed between two transverse bars of the rectangular frame. The lifting screw rod is rotatable relative to the rectangular frame. The longitudinal slider is provided with a thread hole. The lifting screw rod passes through the thread hole.

Optionally, a lifting rotating handle is further mounted on the rectangular frame. The lifting rotating handle is connected to the lifting screw rod and may drive the lifting screw rod to rotate.

The longitudinal guide rail includes a first longitudinal guide rail portion and a second longitudinal guide rail portion. The two ends of the longitudinal slider respectively fit the first longitudinal guide rail portion and the second longitudinal guide rail portion for guiding, so that a longitudinal movement of the longitudinal slider is more stable and does not tilt. By means of fitting between the lifting screw rod and the longitudinal slider, a rotating motion of the lifting screw rod may be converted into a longitudinal displacement of the longitudinal slider. In addition, the longitudinal displacement is controlled by controlling a rotation angle, thereby implementing a precise micro adjustment of the longitudinal displacement. Therefore, the longitudinal displacement has high precision, and the calibration apparatus can be precisely located to a required height. Disposing of the lifting rotating handle facilitates an operation of an operator. The lifting screw rod may be driven to rotate by rotating the lifting rotating handle.

Optionally, the guide rail further includes a transverse guide rail, the transverse guide rail being fastened on the longitudinal slider.

The slider further includes a transverse slider, the transverse slider being movable along the transverse guide rail.

The transverse guide rail is fastened on the longitudinal slider, so that after the longitudinal slider drives the transverse guide rail and the transverse slider to move to a required longitudinal height, the transverse slider is movable along the transverse guide rail, to adjust a transverse position of the transverse slider, and further to move the calibration apparatus fastened on the transverse slider to a horizontal position required by calibration, thereby facilitating calibration for the sensors.

In this embodiment, by means of fitting between the longitudinal guide rail and the longitudinal slider, a longitudinal height of the calibration apparatus can be adjusted; and by means of fitting between the transverse guide rail and the transverse slider, the horizontal position of the calibration apparatus can be adjusted. Therefore, the calibration apparatus can be adjusted both in a horizontal direction and in a longitudinal direction, thereby satisfying requirements when various sensors are calibrated.

Optionally, a crossbeam is fastened on the longitudinal slider, the transverse guide rail being fastened on the crossbeam, or the transverse guide rail being formed by grooving on one side of the crossbeam.

The crossbeam is disposed to be mainly configured to fasten the transverse guide rail or to form the transverse guide rail on the crossbeam. Then, the crossbeam is fixedly connected to the longitudinal slider, thereby implementing indirect fastening between the transverse guide rail and the longitudinal slider.

Optionally, the crossbeam is provided with a transverse scale, and the longitudinal guide rail is provided with a longitudinal scale.

The transverse scale and the longitudinal scale are disposed to facilitate the operator to learn a distance of a transverse movement and a distance of a longitudinal movement. Therefore, it is more convenient for the operator to adjust the calibration apparatus to an appropriate position.

Optionally, the longitudinal slider is provided with a first adjusting bolt, the first adjusting bolt passing through the longitudinal slider to abut against the crossbeam; or, the crossbeam is provided with a first adjusting bolt, the first adjusting bolt passing through the crossbeam to abut against the longitudinal slider.

A posture of the crossbeam is adjusted by rotating the first adjusting bolt.

In this embodiment, the first adjusting bolt may be disposed on the longitudinal slider, and passes through the longitudinal slider to abut against the crossbeam. Alternatively, the first adjusting bolt may be disposed on the crossbeam, and passes through the crossbeam to abut against the longitudinal slider. In this way, a distance between the crossbeam and the longitudinal slider can be adjusted by rotating the first adjusting bolt, so that an angle between the crossbeam and the longitudinal slider changes. For example, the crossbeam and the longitudinal slider may be disposed in parallel, or there may be a certain included angle between the crossbeam and the longitudinal slider, so that the posture of the crossbeam changes, thereby enabling postures of the transverse guide rail and the transverse slider to change. The first adjusting bolt is disposed, so that the calibration apparatus fastened on the transverse slider has an adjustment dimension. Therefore, an adjustable range of the position of the calibration apparatus expands and the calibration apparatus can be applied to calibration for more sensors.

Optionally, the auxiliary calibration device further includes a fixing plate fastened on the longitudinal slider. The fixing plate is configured to fasten a first calibration apparatus.

Optionally, the fixing plate is configured to be fastened to the first calibration apparatus by means of bonding or a magnetic attraction force.

Optionally, the fixing plate is provided with a fixing portion made of a soft magnetic material or a permanent magnetic material; or the fixing plate is made of a soft magnetic material or a permanent magnetic material; or the fixing plate is provided with a fastener.

The fixing plate is fastened to the longitudinal slider, so that a height of the first calibration apparatus fastened on the fixing plate can be adjusted in a longitudinal direction. The fixing plate is provided with the fixing portion made of a soft magnetic material or a permanent magnetic material, or the fixing plate is made of a soft magnetic material or a permanent magnetic material. In this way, the fixing plate can fasten the first calibration apparatus in an attraction manner by using a magnetic force. Therefore, mounting and replacement of the first calibration apparatus are convenient, and the first calibration apparatus can be rapidly disassembled and replaced, thereby facilitating calibration of different sensors. Alternatively, the fixing plate is provided with the fastener. The first calibration apparatus may be fastened on the fixing plate through bonding with the fastener. According to this method, mounting and replacement of the first calibration apparatus are also convenient, and the first calibration apparatus can be quickly disassembled and replaced.

Optionally, the transverse slider is provided with a mounting post or a mounting hole, and is configured to be fastened to a second calibration apparatus by using a screw, or to be fastened to a second calibration apparatus through clamping.

The transverse slider is connected and fastened to the second calibration apparatus by using the screw or through clamping, so that a fastening operation between the transverse slider and the second calibration apparatus is convenient, and the calibration apparatus can be conveniently and rapidly replaced, to perform calibration on different sensors.

Optionally, the transverse slider is provided with a laser.

The laser can determine a position of the calibration apparatus on the transverse slider relative to the vehicle.

Optionally, universal wheels are disposed at the bottom of the supporting frame.

The universal wheels are disposed, so that the auxiliary calibration device may be moved to different positions. In this way, it is convenient to move the auxiliary calibration device to an appropriate position when calibration is performed on different sensors.

Optionally, a second adjusting bolt is disposed at the bottom of the supporting frame. A lower end of the second adjusting bolt passes through the bottom of the supporting frame and is configured to support on a supporting surface.

A posture of the supporting frame is adjusted by rotating the second adjusting bolt.

The second adjusting bolt is disposed at the bottom of the supporting frame. The lower end of the second adjusting bolt passes through the bottom of the supporting frame and is disposed to support on the supporting surface (for example, a ground surface). When the supporting frame integrally tilts due to unevenness of the supporting surface and an angle of the supporting frame needs to be adjusted, the second adjusting bolt may be rotated, so that a distance between the second adjusting bolt and the supporting surface changes. Further, the angle of the supporting frame changes, so that the calibration apparatus fastened on the supporting frame can be adjusted to an appropriate angle for calibration.

Compared with the prior art, beneficial effects of the technical solutions provided in the present invention are as follows.

For the auxiliary calibration device provided in the embodiments of the present invention, a position of a calibration apparatus can be conveniently adjusted, and it is convenient to adjust the calibration apparatus to an appropriate position, thereby facilitating calibration performed on sensors. Further, the calibration apparatus is replaced rapidly and conveniently, thereby further facilitating calibration performed on different sensors.

Other features and advantages of the present invention are described in the subsequent specification, and some of the features and advantages will be apparent from the specification, or may be learned through implementation of the present invention. Objectives and other advantages of the present invention may be implemented and obtained by using the structures particularly mentioned in the specification, claims, and accompanying drawings.

BRIEF DESCRIPTION OF THE DRAWINGS

The drawings are provided to further understand technical solutions of the present invention, and constitute a part of the specification. The drawings, along with the embodiments of the present application, are used to explain the technical solutions of the present invention, and pose no limitation on the technical solutions of the present invention.

Figure 1:
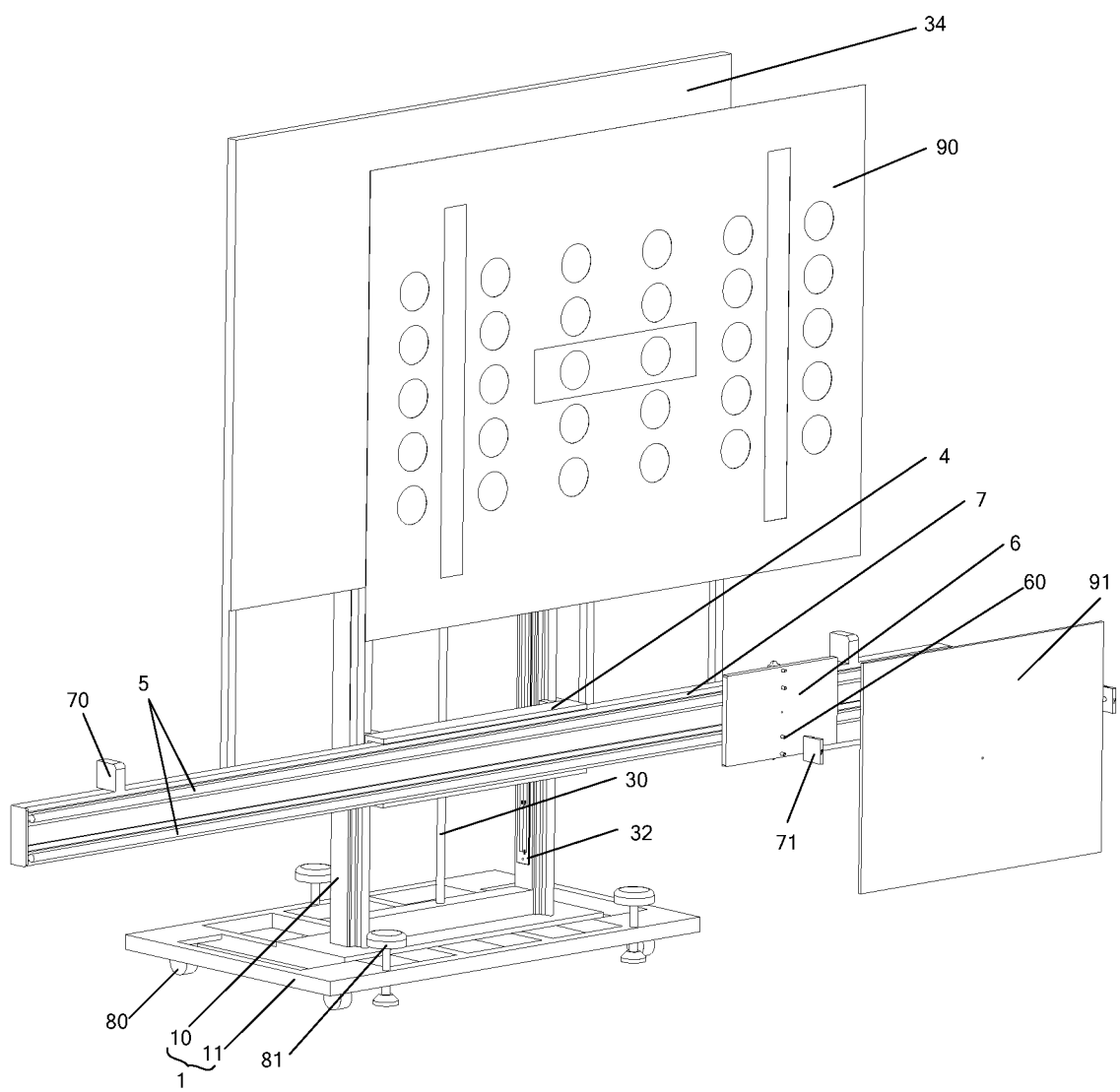
FIG. 1 is a schematic exploded structural diagram when an auxiliary calibration device is used for calibration according to an embodiment of the present invention.
Figure 2:
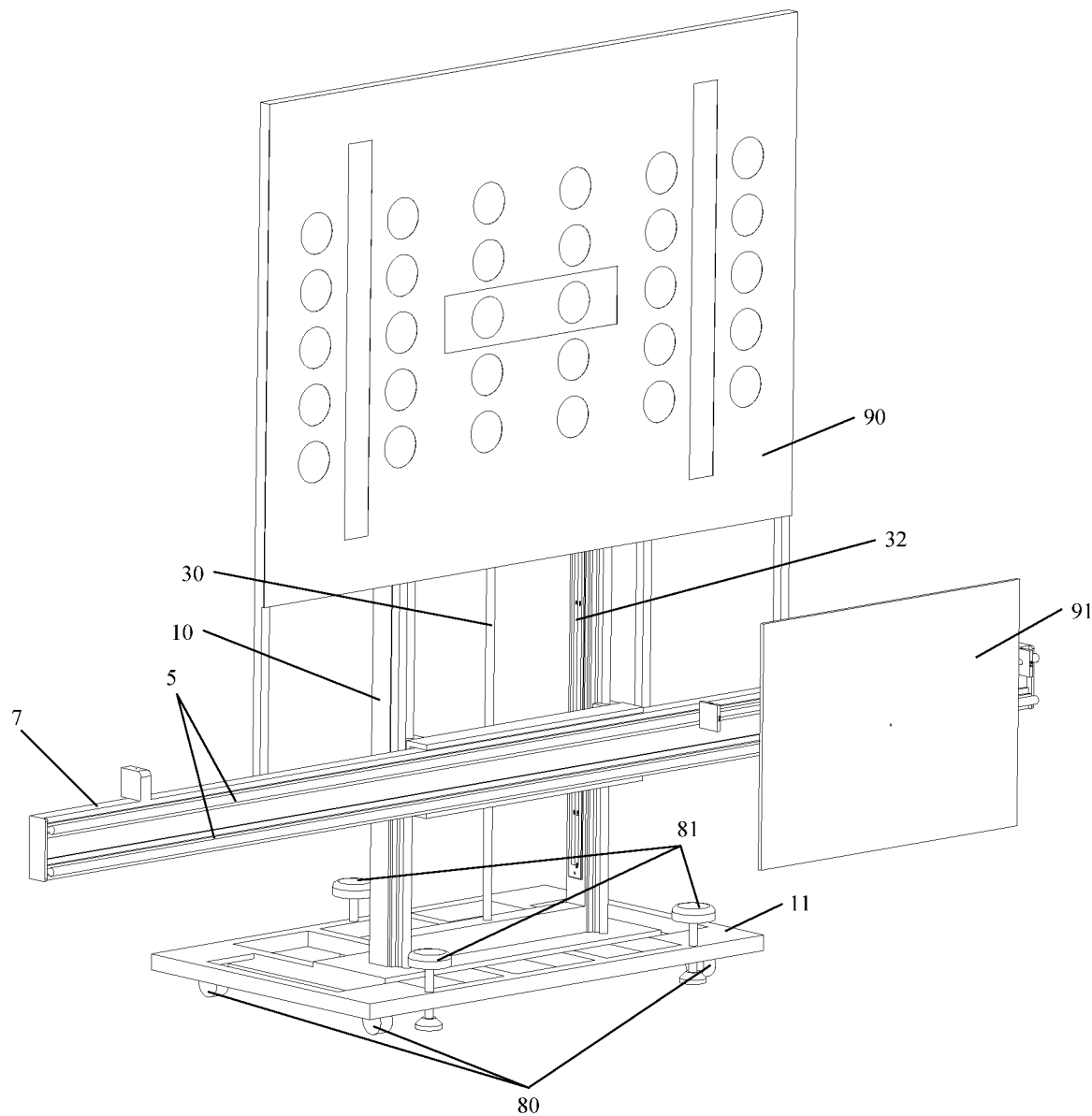
FIG. 2 is a schematic diagram of an assembly structure when the auxiliary calibration device shown in FIG. 1 is used for calibration.
Figure 3:
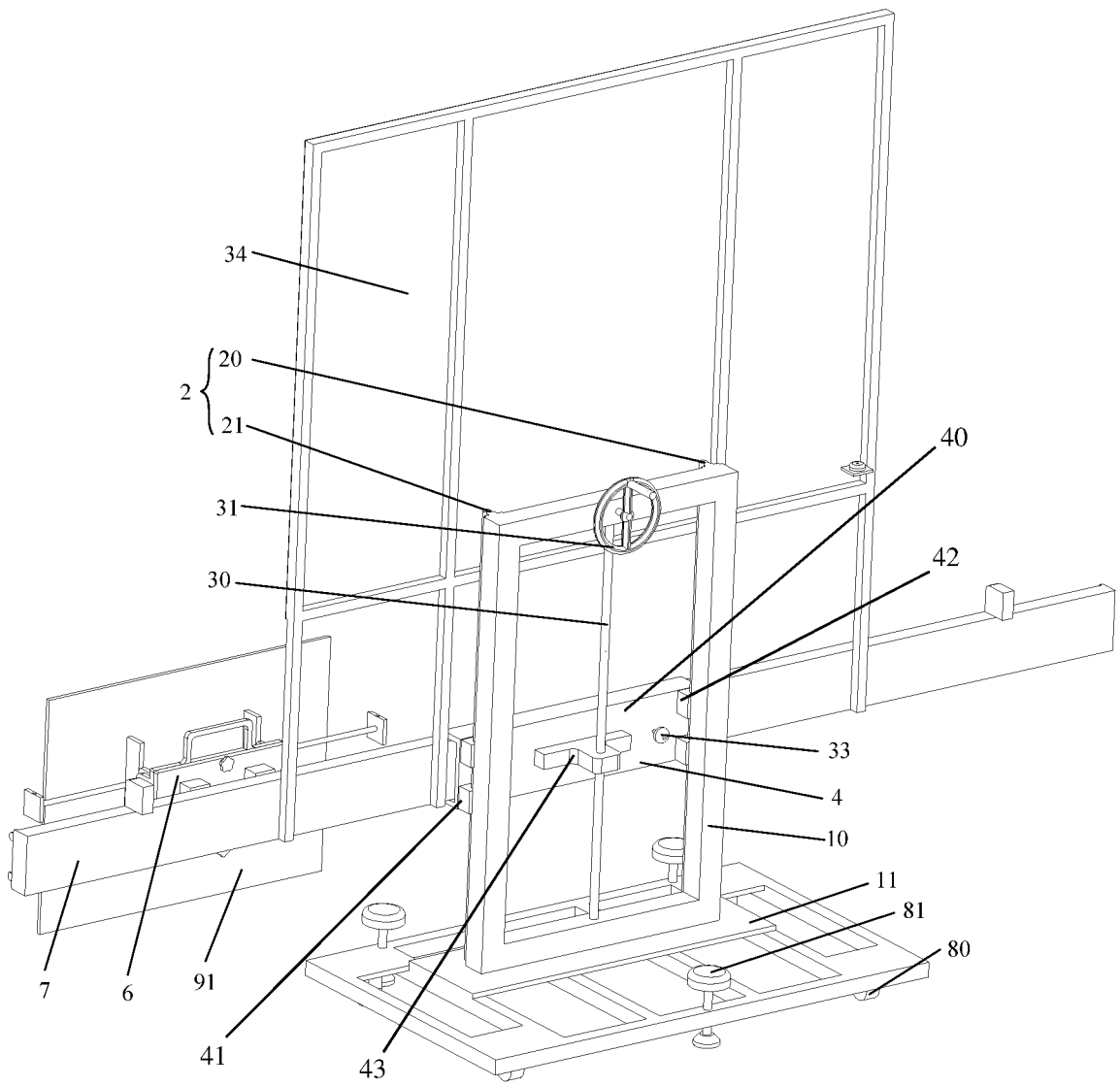
FIG. 3 is a schematic rear structural diagram when the auxiliary calibration device shown in FIG. 1 is used for calibration.

Relationships between the reference numerals and component names in FIG. 1 to FIG. 3 are:

1 supporting frame, 10 rectangular frame, 11 bottom support, 2 longitudinal guide rail, 20 first longitudinal guide rail portion, 21 second longitudinal guide rail portion, 30 lifting screw rod, 31 lifting rotating handle, 32 longitudinal scale, 33 first adjusting bolt, 34 fixing plate, 4 longitudinal slider, 5 transverse guide rail, 6 transverse slider, 60 screw post, 7 crossbeam, 70 transverse scale, 71 laser, 80 universal wheel, 81 second adjusting bolt, 90 calibration pattern, 91 second calibration apparatus.

DETAILED DESCRIPTION

To make the objectives, technical solutions, and advantages of the present invention clearer, the following describes the embodiments of the present invention in detail with reference to the accompanying drawings. It should be noted that, the embodiments in the present application or the features in the embodiments may be arbitrarily combined without conflict.

An embodiment of the present invention provides an auxiliary calibration device. The auxiliary calibration device may be configured to mount one or more calibration apparatuses, to implement calibration and correction for sensors on a vehicle. The sensors herein include a radar sensor, an infrared sensor, an ultrasonic sensor, an image sensor and the like on the vehicle. It should be noted that a calibration apparatus that is required when calibration is performed on the sensors, a position of the calibration apparatus relative to the vehicle and a calibration and correction method have been preset by an engineer. A main function of the auxiliary calibration device in an embodiment of the invention is to mount the calibration apparatus and to adjust the calibration apparatus to a required position, thereby calibrating the sensors. In embodiments of the present application, the term "connect", "attach", or "fasten" means a component A can connect, attach, or fasten to another component B directly or indirectly. When the component A is "connected", "attached", or "fastened" to the component B indirectly, it means the component A is connected, attached, or fastened to component B through one or more intermediate components which is/are disposed between the component A and the component B.

An auxiliary calibration device provided in an embodiment is shown in FIG. 1 to FIG. 3. FIG. 1 is a schematic exploded structural diagram when the auxiliary calibration device is used for calibration. FIG. 2 is a schematic diagram of an assembly structure when the auxiliary calibration device shown in FIG. 1 is used for calibration. FIG. 3 is a schematic rear structural diagram when the auxiliary calibration device shown in FIG. 1 is used for calibration.

The auxiliary calibration device includes a supporting frame 1, a guide rail and a slider. The guide rail is mounted on the supporting frame 1. The slider is mounted on the guide rail, and movable along the guide rail. The slider is configured to fasten a calibration apparatus. The calibration apparatus may be a glass mirror or a reflection plate, any of which is used for reflecting light. The calibration apparatus may also be a pattern plate or a scale plate. The calibration apparatus may be detached from the slider and be replaced with a calibration apparatus of a same type or a different type.

The auxiliary calibration device includes the guide rail and the slider. The slider is movable along the guide rail. Therefore, when calibration is performed, the slider may drive the calibration apparatus on the slider to move, so as to move the calibration apparatus to an appropriate position required by calibration. Therefore, the calibration for the sensors can be easily performed. In a calibration process, a control system of the vehicle can calibrate and correct corresponding sensors according to a calibration result, so that the sensors can work normally, thereby ensuring security performance of the vehicle.

By providing the guide rail and a slider, the calibration apparatus can be conveniently moved to a desired position, thereby facilitating calibration for sensors of different types or sensors of a same type on different models of vehicles. Therefore, the auxiliary calibration device in the embodiment has a good commonality and is conveniently used.

In an embodiment, the guide rail includes a longitudinal guide rail 2, and the slider includes a longitudinal slider 4. The longitudinal slider 4 is movable along the longitudinal guide rail 2, to adjust a height of the longitudinal slider 4, and further to make a first calibration apparatus fastened directly or indirectly on the longitudinal slider 4 move to a height required by calibration, thereby facilitating calibration for the sensors.

In an embodiment, as shown in FIG. 3, the auxiliary calibration device includes two longitudinal guide rails. Both of the two longitudinal guide rails are disposed in a longitudinal direction. One of the two longitudinal guide rails is disposed in parallel with another of the two longitudinal guide rails. A part of one longitudinal guide rail is connected directly or indirectly to a part of another longitudinal guide rail, so that one longitudinal guide rail is partially connected to another longitudinal guide rail. In an embodiment, two distal ends of one longitudinal guide rail are connected to two distal ends of another longitudinal guide rail, respectively. For example, a first distal end of a first longitudinal guide rail is connected to a first distal end of a second longitudinal guide rail by a first transverse component (such as a board disposed in a transverse direction, or an upper transverse bar of the rectangular frame 10), and a second distal end of the first longitudinal guide rail is connected to a second distal end of the second longitudinal guide rail by a second transverse component (such as a board disposed in a transverse direction, or a lower transverse bar of the rectangular frame 10).

In an embodiment, the first and second transverse components are perpendicular to the first and second longitudinal guide rails, as shown in FIG. 3.

There is a gap or space in a longitudinal direction formed between the first transverse component and the second transverse component, as shown in FIG. 3. The separate two longitudinal guide rails and the first and second transverse components can be made integrally. For example, in an embodiment, the separate two longitudinal guide rails and the first and second transverse components are molded into one piece. Alternatively, the separate two longitudinal guide rails can be attached to the first and second transverse components by one or more screws. It can be understood that the number of the transverse components is not limited. For example, more than two transverse components can be provided to attach the first longitudinal guide rail to the second longitudinal guide rail.

In an embodiment, there is a space or gap in a transverse direction formed between the two longitudinal guide rails. For example, there is a gap between the middle parts of the two longitudinal guide rails 20 and 21, as shown in FIG. 3.

In an embodiment, the two longitudinal guide rails and the first and second transverse component forms a rectangular frame. For example, as shown in FIG. 3, the supporting frame 1 includes a rectangular frame 10 that is disposed in a longitudinal direction, and the longitudinal guide rail 2 includes a first longitudinal guide rail portion 20 and a second longitudinal guide rail portion 21 that are disposed on two longitudinal bars of the rectangular frame 10. A left end and a right end of the longitudinal slider 4 respectively fit the first longitudinal guide rail portion 20 and the second longitudinal guide rail portion 21. The left end and the right end of the longitudinal slider 4 respectively fit the first longitudinal guide rail portion 20 and the second longitudinal guide rail portion 21 for guiding, so that a longitudinal movement of the longitudinal slider 4 is more stable and does not tilt.

As shown in FIG. 3, the longitudinal slider 4 includes a board 40, a left sliding block 41 attached to a left end of the board 40, a right sliding block 42 attached to a right end of the board 40, and a threaded portion 43 attached to a middle portion of the board 40. The left sliding block 41 is disposed on the left end of the longitudinal slider 4, and the right sliding block 42 is disposed on the right end of the longitudinal slider 4.

In an embodiment, the left sliding block 41 and the right sliding block 42 are attached to left and right distal ends of the board 40, respectively. The left sliding block 41 and right sliding block 42 of the longitudinal slider 4 can slide along the first longitudinal guide rail portion 20 and the second longitudinal guide rail portion 21, respectively. The longitudinal slider 4 is moveable along the first and second longitudinal guide rail portions 20, 21 through the left sliding block 41 and the right sliding block 42.

The left sliding block 41 and right sliding block 42 can be attached to the board 40 by one or more screws. Alternatively, the left sliding block 41 and the right sliding block 42 are integrally formed and molded with the board 40. In this case, the left sliding block 41, right sliding block 42 and the board 40 of the longitudinal slider 4 are formed integrally in one piece. In some other embodiments, one of the sliding blocks 41 and 42 is attached to the board by one or more screws, and another of the sliding blocks 41 and 42 and the board 40 are integrally made by molding.

In an embodiment, the threaded portion 43 of the longitudinal slider 4 is attached to the board 40 by one or more screws. In some other embodiments, the threaded portion 43 and the board 40 are made integrally by molding into one piece.

As shown in FIG. 3, there are two left sliding blocks 41 and two right sliding blocks 42. However, the number of the left sliding block and the right sliding block is not limited in present invention. The number of left sliding block 41 is the same as the number of the right sliding block 42. In an embodiment, the longitudinal slider 4 can include one left sliding block and one right sliding block. In some other embodiments, the longitudinal slider 4 can include three, four, or five left sliding blocks and three, four, or five right sliding blocks.

In an embodiment, as shown in FIGS. 1-3, the board 40 of the longitudinal slider 4 is configured to attach or connect with a crossbeam 7 or a transverse guide rail 5 so that the crossbeam 7 or the transverse guide rail 5 can slide along the longitudinal guide rail 2 with the longitudinal slider 4.

Further, in an embodiment, a lifting screw rod 30 is provided so as to adjust a height of the longitudinal slider 4. The lifting screw rod 30 is rotatable relative to the first longitudinal guide rail 20 and the second longitudinal guide rail 21.

As shown in FIG. 3, the lifting screw rod 30 is disposed in parallel with any of the first longitudinal guide rail portion 20 and the second longitudinal guide rail portion 21. In an embodiment, the lifting screw rod 30, the first longitudinal guide rail portion 20 and the second longitudinal guide rail portion 21 are all in a same plane, as shown in FIG. 3. In some other embodiment, the lifting screw rod 30 is not in the plane formed by the first longitudinal guide rail portion 20 and the second longitudinal guide rail portion 21.

In an embodiment, as shown in FIG. 3, a space or gap is formed between the lifting screw rod 30 and each of the first longitudinal guide rails 20 and the second longitudinal guide rail 21.

In an embodiment, as shown in FIG. 3, the threaded portion 43 is disposed between the left sliding block 41 and the right sliding block 42 of the longitudinal slider 4.

In an embodiment, the threaded portion 43 is disposed in a same side at which the left sliding block 41 and the right sliding block 42 are located. For example, as shown in FIG. 3, the threading portion 40 and the sliding blocks 41,42 are disposed at a side of the board 40 opposite to the side attached to the crossbeam 7 or the transverse guide rail 5.

The threaded portion 43 is configured to engage with the lifting screw rod 30. In an embodiment, the threaded portion 43 is provided with a thread hole. The lifting screw rod 30 passes through the thread hole and engages with the thread hole.

The shape of a cross section of the thread hole is a circle or a circular sector. In an embodiment, as shown in FIG. 3, the cross section of the thread hole is a circle, and the lifting screw rod 30 passes through the thread hole and fully engages with the thread hole. In some other embodiments, the cross section of the thread hole is a circular sector, and the lifting screw rod 30 passes through the thread hole and partially engages with the thread hole.

By means of engagement between the lifting screw rod 30 and the threaded portion 43 of the longitudinal slider 4, a rotating motion of the lifting screw rod 30 may be converted into a longitudinal movement of the longitudinal slider 4.

The lifting screw rod 30 is pivotally or rotatably connected to the first transverse component and the second transverse component. As shown in FIG. 3, one distal end of the lifting screw rod is rotatably connected to the first transverse component, and another distal end of the lifting screw rod is rotatably connected to the second transverse component. In an embodiment, as shown in FIG. 3, the lifting screw rod 30 is disposed between two transverse bars of the rectangular frame 10. The lifting screw rod 30 is rotatable relative to the rectangular frame 10. In this case, the first and second transverse components are the two transverse bars of the rectangular frame 10. The lifting rotating handle 31 is mounted on the transverse bars of the rectangular frame 10. However, in some other embodiments, the lifting rotating handle 31 can be mounted at some other place so long as the lifting rotating handle 31 is connected to the lifting screw rod 30.

The longitudinal movement is controlled by controlling a rotation angle, thereby implementing a precise micro adjustment of the longitudinal movement. Therefore, the longitudinal displacement has high precision, and the first calibration apparatus can be precisely located to a required height.

To facilitate rotating the lifting screw rod 30, a lifting rotating handle 31 is provided. The lifting rotating handle 31 is connected to the lifting screw rod 30. An operator may drive the lifting screw rod 30 to rotate by rotating the lifting rotating handle 31.

Optionally, a longitudinal scale 32 is provided to facilitate the operator to learn the distance of the longitudinal movement. In an embodiment, as shown in FIGS. 1-2, the longitudinal scale 32 is disposed on the longitudinal guide rail 2. In some other embodiments, there is a housing for accommodating the longitudinal guide rail 2. The longitudinal scale 32 is disposed on the housing. Because of the longitudinal scale 32, it is more convenient for the operator to adjust the first calibration apparatus to an appropriate height.

Optionally, the auxiliary calibration device further includes a fixing plate 34 fastened directly or indirectly on the longitudinal slider 4. In an embodiment, the fixing plate 34 may be fastened in a middle part of a crossbeam 7 that is fastened to the longitudinal slider 4. The fixing plate 34 is provided to fasten the first calibration apparatus. When the longitudinal slider 4 moves along the longitudinal guide rail 2, the crossbeam 7 on the longitudinal slider 4 and the fixing plate 34 on the crossbeam 7 move in a longitudinal direction along with the longitudinal slider 4, so as to adjust the height of the first calibration apparatus on the fixing plate 34.

Optionally, the fixing plate 34 is provided with a fixing portion made of a soft magnetic material or a permanent magnetic material; or the fixing plate 34 is made of a soft magnetic material or a permanent magnetic material. In this way, the fixing plate 34 can fasten the first calibration apparatus in an attraction manner by using a magnetic force. Therefore, mounting and replacement of the first calibration apparatus are convenient, and the first calibration apparatus can be rapidly disassembled and replaced, thereby facilitating calibration of different sensors.

For example, when performing calibration on a camera, the first calibration apparatus is a calibration pattern 90. The calibration pattern 90 may be attracted onto the fixing plate 34 by using a magnetic attraction force, so that it is convenient to fasten and disassemble the calibration pattern 90, thereby facilitating calibration for cameras of different vehicles.

Optionally, the fixing plate 34 may alternatively fasten the first calibration apparatus through bonding. For example, the fixing plate 34 may be provided with a fastener. The first calibration apparatus may be fastened on the fixing plate 34 through bonding with the fastener. According to this method, mounting and replacement of the first calibration apparatus are also convenient, and the first calibration apparatus can be quickly disassembled and replaced.

Optionally, the guide rail further includes a transverse guide rail 5. The transverse guide rail 5 is fastened directly or indirectly on the longitudinal slider 4. The slider further includes a transverse slider 6. The transverse slider 6 is movable along the transverse guide rail 5.

The transverse guide rail 5 is fastened on the longitudinal slider 4, so that after the longitudinal slider 4 makes the transverse guide rail 5 and the transverse slider 6 move to a required longitudinal height, the transverse slider 6 is movable along the transverse guide rail 5, to adjust a transverse position of the transverse slider 6, and further to move a second calibration apparatus 91 fastened on the transverse slider 6 to a horizontal position required by calibration, thereby facilitating calibration for the sensors.

In the embodiment, by means of fitting between the longitudinal guide rail 2 and the longitudinal slider 4, a longitudinal height of the second calibration apparatus 91 can be adjusted. By means of fitting between the transverse guide rail 5 and the transverse slider 6, the horizontal position of the second calibration apparatus 91 can be adjusted. Therefore, the second calibration apparatus 91 can be adjusted both in a horizontal direction and in a longitudinal direction, thereby satisfying requirements when various sensors are calibrated.

Optionally, the crossbeam 7 is fastened on the longitudinal slider 4, and the transverse guide rail 5 is fastened on the crossbeam 7. The crossbeam 7 is provided to be mainly configured to fasten the transverse guide rail 5. The crossbeam 7 is fixedly connected to the longitudinal slider 4, thereby implementing indirect fastening between the transverse guide rail 5 and the longitudinal slider 4.

In an embodiment, the transverse guide rail 5 includes a first transverse guide rail portion and a second transverse guide rail portion. An upper end and a lower end of the transverse slider 6 respectively fit the first transverse guide rail portion and the second transverse guide rail portion for guiding, so that the movement of the transverse slider 6 is stable, and does not tilt.

Certainly, the transverse guide rail may be formed by another means. For example, the transverse guide rail is formed by grooving on one side of the crossbeam, so that the transverse slider slides in the groove.

Optionally, the crossbeam 7 or the transverse guide rail is provided with a transverse scale 70. Specifically, the transverse scale 70 may be an enclosed ruler.

The transverse scale 70 is provided to facilitate the operator to learn the distance of the transverse movement. Therefore, it is more convenient for the operator to adjust the second calibration apparatus 91 to an appropriate position.

Optionally, one of the longitudinal slider 4 and the crossbeam 7 is provided with a first adjusting bolt 33. The first adjusting bolt 33 passes through one of the longitudinal slider 4 and the crossbeam 7 to abut against the other of the longitudinal slider 4 and the crossbeam 7. In the embodiment, the first adjusting bolt 33 is disposed on the longitudinal slider 4, and passes through the longitudinal slider 4 to abut against the crossbeam 7. A posture of the crossbeam 7 or the transverse guide rail may be adjusted by rotating the first adjusting bolt 33.

Specifically, a distance between the crossbeam 7 and the longitudinal slider 4 may be adjusted by rotating the first adjusting bolt 33, so that an angle between the crossbeam 7 and the longitudinal slider 4 changes. For example, the crossbeam 7 and the longitudinal slider 4 are disposed in parallel, or there is a certain included angle between the crossbeam 7 and the longitudinal slider 4, or the crossbeam 7 is in parallel with a width direction of the vehicle. The posture of the crossbeam 7 changes, so that postures of the transverse guide rail 5 and the transverse slider 6 change. The first adjusting bolt 33 is provided so that the second calibration apparatus 91 fastened on the transverse slider 6 has an additional adjustment dimension. Therefore, an adjustable range of the position of the second calibration apparatus 91 expands and the second calibration apparatus 91 can be applicable to calibration of more sensors.

Certainly, the first adjusting bolt 33 may alternatively be disposed on the crossbeam 7, and pass through the crossbeam 7 to abut against the longitudinal slider 4. In this case, the posture of the crossbeam 7 may also be changed by adjusting the first adjusting bolt 33.

Optionally, the transverse slider 6 is provided with a screw post 60 (or a screw hole). The transverse slider 6 is configured to be fastened to the second calibration apparatus 91 by using a screw.

The transverse slider 6 is connected and fastened to the second calibration apparatus 91 by using the screw, so that a fastening operation between the transverse slider 6 and the second calibration apparatus 91 is convenient, and the second calibration apparatus 91 can be conveniently and rapidly replaced, to perform calibration on different sensors.

Certainly, the second calibration apparatus may alternatively be fastened by another means. For example, the second calibration apparatus is fastened on the transverse slider through clamping, so that mounting and disassembling operations of the second calibration apparatus are also convenient. In some other embodiments, the second calibration apparatus can be attached to the transverse slider by magnetism (through magnetic force).

Optionally, universal wheels 80 are disposed at the bottom of the supporting frame 1. Specifically, in an embodiment, the supporting frame 1 includes a bottom support 11 disposed at the bottom and placed in a transverse direction. Four corner portions of the bottom support 11 are all provided with the universal wheel 80.

The universal wheels 80 are provided so that the auxiliary calibration device may be moved to different positions. It is convenient to move the auxiliary calibration device to an appropriate position when calibration is performed on different sensors.

Optionally, a second adjusting bolt 81 is disposed on the bottom support 11 at the bottom of the supporting frame 1. In an embodiment, three second adjusting bolts 81 are disposed on the bottom support 11. A lower end of each second adjusting bolt 81 passes through the bottom support 11 and is disposed to support on a supporting surface (for example, a ground surface). A posture of the supporting frame 1 is adjusted by rotating the second adjusting bolt 81.

When the supporting frame 1 integrally tilts due to unevenness of the supporting surface and an angle of the supporting frame 1 needs to be adjusted, the second adjusting bolts 81 may be rotated, so that a distance between the second adjusting bolts 81 and the supporting surface changes. Further, the angle of the supporting frame 1 changes, so that the first calibration apparatus or the second calibration apparatus 91 fastened on the supporting frame 1 can be adjusted to an appropriate angle for calibration.

The auxiliary calibration device in the embodiment is specifically described below with reference to FIG. 1 to FIG. 3.

The embodiment mainly relates to an advanced driver assistant system of a vehicle such as an automobile, so that driving of the automobile is more secure, and the driver is more relaxed.

To ensure that the automobile is safer during a driving process, the auxiliary calibration device mainly implements correction and calibration on various sensors mounted on the automobile, to ensure normal work of the sensors. The auxiliary calibration device may implement calibration on systems of various car series such as a radar system, a lane keeping system, a night vision system, and a blind spot system.

Specifically, the auxiliary calibration device mainly includes the following several parts: a supporting frame 1, a longitudinal guide rail 2 and a longitudinal slider 4, a lifting screw rod 30 and a lifting rotating handle 31, a transverse guide rail 5 and a transverse slider 6, a first adjusting bolt 33 and a second adjusting bolt 81, a longitudinal scale 32 and a transverse scale 70, a fixing plate 34, universal wheels 80, a laser 71 and the like.

The universal wheels 80 are configured to adjust the supporting frame 1 to an appropriate position.

The second adjusting bolt 81 may adjust the supporting frame 1 to make a rectangular frame 10 is perpendicular to a length direction of the vehicle.

The longitudinal guide rail 2 guides the longitudinal slider 4 to move in a longitudinal direction, and enables the crossbeam 7, the fixing plate 34, the transverse guide rail 5 and the transverse slider 6 to move in a longitudinal direction.

The lifting rotating handle 31 is rotated to drive the longitudinal slider 4 to move through the lifting screw rod 30, so as to adjust the second calibration apparatus 91 and a calibration pattern 90 to an appropriate height.

The transverse guide rail 5 guides the transverse slider 6 to move in a transverse direction, to ensure that the second calibration apparatus 91 moves in a horizontal direction, thereby ensuring a transverse position of the second calibration apparatus 91.

The first adjusting bolt 33 is configured to adjust the crossbeam 7 to keep parallel with a width direction of the vehicle.

The fixing plate 34 may be configured to fasten the calibration pattern 90 required for calibrating a camera. The calibration pattern 90 may be attracted onto the fixing plate 34 by magnetism. The transverse slider 6 may be configured to fasten the second calibration apparatus 91. For example, when calibration is performed on a radar, a required second calibration apparatus 91 is a radar calibration target board. The radar calibration target board may be fastened on the transverse slider 6 by using a screw. In a specific calibration process, the radar calibration target board and the calibration pattern 90 may be rapidly replaced according different car series or a test requirement. Alternatively, when calibration is performed on different sensors, the fixing plate 34 and the transverse slider 6 may fasten different calibration apparatuses.

The laser 71, the longitudinal scale 32 and the transverse scale 70 are configured to determine that the radar calibration target board and the calibration pattern 90 are moved to appropriate positions.

The auxiliary calibration device in the embodiment may implement correction and calibration for sensors such as various automobile radars, a camera and a lens. Specifically, when calibration is performed, a position of the calibration apparatus may be determined by using the laser 71 on the transverse slider 6. The position of the calibration apparatus can be adjusted in an up-down and left-right manner by moving the longitudinal slider 4 in an up-down manner and moving the transverse slider 6 in a left-right manner. The movement in an up-down manner is adjusted by the lifting rotating handle 31, and for the movement in a left-right manner, the transverse slider 6 is manually pushed to an appropriate position. The radar calibration target board on the transverse slider 6 is connected and fastened by using a solid bolt, and can be rapidly replaced. The fixing plate 34 is fastened on a middle position of the crossbeam 7. Adjustment of an upper position and a lower position of the fixing plate 34 is the same as that of the radar calibration target board. The calibration pattern 90 on the fixing plate 34 is fastened in an attraction manner by using a magnetic attraction force, and may be rapidly detached and replaced.

For example, when an adaptive cruise control (ACC) system (for example, a radar) is calibrated, the second calibration apparatus (for example, the radar calibration target board) 91 is mounted on the transverse slider 6, and then the fastening bolt is tightened. When a lane keeping system is calibrated, the calibration pattern 90 with magnetism or stickiness is attracted or stuck to the fixing plate 34.

In conclusion, for the auxiliary calibration device in this embodiment, the guide rail and the slider are provided so that the position of the calibration apparatus can be adjusted. The scales, the laser and the adjusting bolts are provided so as to move the calibration apparatus to an appropriate position. The calibration apparatus is fastened by magnetic attraction or by using the bolt, so that replacement of the calibration apparatus is convenient. Therefore, the auxiliary calibration device in this embodiment can perform calibration on sensors precisely, conveniently and efficiently. Moreover, it has good controllability, high precision and wide applicability, and is convenient and fast.

It should be noted that various components of the auxiliary calibration device provided in embodiments of the invention can be connected with each other through one or more screws. Alternatively, various components of the auxiliary calibration device can be made integrally by molding.

Although the disclosed implementations of the present invention are described above, the described content is merely an implementation adopted for ease of understanding the present invention, and is not intended to limit the present invention. Any person skilled in the art of the present invention may make any modification and change to the implementation forms and details without departing from the spirit and scope disclosed in the present invention. However, the patent protection scope of the present invention may still be subject to the appended claims.

What is claimed is:

1. An auxiliary calibration device configured to mount at least one calibration apparatus, wherein the auxiliary calibration device comprises:
   a bottom support;
   longitudinal guide rails attached to the bottom support, the longitudinal guide rails comprising:
   a first longitudinal guide rail; and
   a second longitudinal guide rail disposed in parallel with the first longitudinal guide rail;
   wherein a first distal end of the first longitudinal guide rail is connected to a first distal end of the second longitudinal guide rail through a first transverse component, a second distal end of the first longitudinal guide rail being connected to a second distal end of the second longitudinal guide rail through a second transverse component;
   wherein a space in a longitudinal direction is formed between the first transverse component and the second transverse component, a space in a transverse direction being formed between the first longitudinal guide rail and the second longitudinal guide rail;
   a longitudinal slider configured to be movable along the longitudinal guide rails, the longitudinal slider comprising:
   a board;
   first group of sliding blocks attached to the board;
   second group of sliding blocks attached to the board; and
   a threaded portion attached to the board;
   wherein the first group of sliding blocks, the second group of sliding blocks, and the threaded portion of the longitudinal slider are disposed on a same side of the board, the threaded portion being disposed between the first group of sliding blocks and the second group of sliding blocks of the longitudinal slider;
   wherein the first group of sliding blocks of the longitudinal slider are configured to be movable along the first longitudinal guide rail, and the second group of sliding blocks of the longitudinal slider are configured to be movable along the second longitudinal guide rail; and
   a lifting screw rod configured to engage with the threaded portion of the longitudinal slider, the lifting screw rod being configured to rotate relative to the first longitudinal guide rail and the second longitudinal guide rail;
   wherein a rotation motion of the lifting screw rod is converted into a longitudinal movement of the longitudinal slider;
   a crossbeam attached to the board of the longitudinal slider, the crossbeam extending along a direction non-perpendicular to a length direction of the board;
   wherein the at least one calibration apparatus is used for calibration performing on a sensor of a vehicle.

2. The auxiliary calibration device according to claim 1, wherein the lifting screw rod is rotatably connected to the first transverse component and the second transverse component.

3. The auxiliary calibration device according to claim 2, wherein one distal end of the lifting screw rod is rotatably connected to the first transverse component, the other distal end of the lifting screw rod being rotatably connected to the second transverse component.

4. The auxiliary calibration device according to claim 1, wherein the lifting screw rod is disposed in parallel with each of the first longitudinal guide rail and the second longitudinal guide rail.

5. The auxiliary calibration device according to claim 1, wherein a space is formed between the lifting screw rod and each of the first longitudinal guide rail and the second longitudinal guide rail.

6. The auxiliary calibration device according to claim 1, wherein the threaded portion is disposed on a middle part of the board, the first group of sliding blocks being disposed on a first end of the board, the second group of sliding blocks being disposed on a second end of the board.

7. The auxiliary calibration device according to claim 1, wherein the threaded portion is provided with a thread hole, the lifting screw rod passing through the thread hole and engaging with the thread hole.

8. The auxiliary calibration device according to claim 7, wherein the lifting screw rod is configured to fully or partially engage with the thread hole.

9. The auxiliary calibration device according to claim 1, wherein each of the first longitudinal guide rail and the second longitudinal guide rail is perpendicular to each of the first transverse component and the second transverse component.

10. The auxiliary calibration device according to claim 1, wherein each of the first longitudinal guide rail and the second longitudinal guide rail is connected to each of the first transverse component and the second transverse component by one or more screws.

11. The auxiliary calibration device according to claim 1, wherein the first group of sliding blocks of the longitudinal slider are attached to the board of the longitudinal slider by one or more screws, wherein the second group of sliding blocks of the longitudinal slider are attached to the board of the longitudinal slider by one or more screws;
 wherein the threaded portion of the longitudinal slider is attached to the board by one or more screws.

12. The auxiliary calibration device according to claim 1, further comprising a transverse guide rail,
 wherein the transverse guide rail is attached on the crossbeam, or the transverse guide rail is formed by grooving on a side of the crossbeam.

13. The auxiliary calibration device according to claim 12, further comprising:
 a transverse slider configured to be movable along the transverse guide rail.

14. An auxiliary calibration device configured to mount at least one calibration apparatus, the auxiliary calibration device comprising:
 a bottom support;
 spaced longitudinal guide rails attached to the bottom support, the longitudinal guide rails comprising a first longitudinal guide rail and a second longitudinal guide rail disposed in parallel with the first longitudinal guide rail;
 a longitudinal slider configured to be movable along the longitudinal guide rails, wherein the longitudinal slider comprises:
  a board;
  a first group of sliding blocks attached to the board;
  a second group of sliding blocks attached to the board; and
  a threaded portion attached to the board;
  wherein the first group of sliding blocks, the second group of sliding blocks, and the threaded portion of the longitudinal slider are disposed on a same side of the board, the threaded portion being disposed between the first group of sliding blocks and the second group of sliding blocks of the longitudinal slider;
  wherein the first group of sliding blocks of the longitudinal slider are configured to slide along the first longitudinal guide rail, and the second group of sliding blocks of the longitudinal slider are configured to slide along the second longitudinal guide rail; and
 a lifting screw rod configured to engage with the threaded portion of the longitudinal slider, the lifting screw rod being configured to rotate relative to the first longitudinal guide rail and the second longitudinal guide rail;
 wherein a rotation motion of the lifting screw rod is converted into a longitudinal movement of the longitudinal slider;
 a crossbeam attached to the board of the longitudinal slider, the crossbeam extending along a direction non-perpendicular to a length direction of the board;
 wherein the at least one calibration apparatus is used for calibration performing on a sensor of a vehicle.

15. The auxiliary calibration device according to claim 14, wherein the first longitudinal guide rail is connected to the second longitudinal guide rail through spaced transverse components including a first transverse component and a second transverse component.

16. The auxiliary calibration device according to claim 15, wherein the lifting screw rod is rotatably connected to the first transverse component and the second transverse component.

17. The auxiliary calibration device according to claim 16, wherein one distal end of the lifting screw rod is rotatably connected to the first transverse component, another distal end of the lifting screw rod being rotatably connected to the second transverse component.

18. The auxiliary calibration device according to claim 15, wherein each of the first longitudinal guide rail and the second longitudinal guide rail is perpendicular to each of the first transverse component and the second transverse component.

19. The auxiliary calibration device according to claim 14, wherein the lifting screw rod is disposed in parallel with each of the first longitudinal guide rail and the second longitudinal guide rail.

20. The auxiliary calibration device according to claim 14, wherein a space is formed between the lifting screw rod and each of the first longitudinal guide rail and the second longitudinal guide rail.

21. The auxiliary calibration device according to claim 14, wherein the threaded portion is disposed on a middle part of the board, the first group of sliding blocks being disposed on a first end of the board, the second group of sliding blocks being disposed on a second end of the board.

22. The auxiliary calibration device according to claim 14, wherein the threaded portion is provided with a thread hole, the lifting screw rod passing through the thread hole and engaging with the thread hole.

23. The auxiliary calibration device according to claim 14, wherein the first group of sliding blocks of the longitudinal slider are attached to the board of the longitudinal slider by one or more screws, the second group of sliding blocks of the longitudinal slider being attached to the board of the longitudinal slider by one or more screws;
 wherein the threaded portion of the longitudinal slider is attached to the board by one or more screws.

24. An auxiliary calibration device configured to mount at least one calibration apparatus, wherein the auxiliary calibration device comprises:
 a bottom support;
 spaced longitudinal guide rails attached to the bottom support, the longitudinal guide rails comprising a first longitudinal guide rail and a second longitudinal guide rail disposed in parallel with the first longitudinal guide rail;
 a longitudinal slider configured to be movable along the first longitudinal guide rail and the second longitudinal guide rail; and
 a lifting screw rod configured to engage with the longitudinal slider, the lifting screw rod being configured to rotate relative to the first longitudinal guide rail and the second longitudinal guide rail, wherein a rotation motion of the lifting screw rod is converted into a longitudinal movement of the longitudinal slider;

wherein the lifting screw rod is disposed in parallel with each of the first longitudinal guide rail and the second longitudinal guide rail;

wherein a space is formed between the lifting screw rod and each of the first longitudinal guide rail and the second longitudinal guide rail;

a crossbeam attached to a board of the longitudinal slider, the crossbeam extending along a direction non-perpendicular to a length direction of the board;

wherein the at least one calibration apparatus is used for calibration performing on a sensor of a vehicle.

25. The auxiliary calibration device according to claim 24, wherein the first longitudinal guide rail is connected to the second longitudinal guide rail through spaced transverse components including a first transverse component and a second transverse component;

wherein each of the first transverse component and the second transverse component is perpendicular to each of the first longitudinal guide rail and the second longitudinal guide rail.

26. The auxiliary calibration device according to claim 25, wherein one end of the lifting screw rod is rotatably connected to the first transverse component, and another end of the lifting screw rod is rotatably connected to the second transverse component.

* * * * *